United States Patent
Suzuki

(10) Patent No.: US 7,110,339 B2
(45) Date of Patent: Sep. 19, 2006

(54) INFORMATION RECORDING/REPRODUCING DEVICE AND A METHOD OF RECORDING A LEAD-OUT

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 632 days.

(21) Appl. No.: 10/236,945

(22) Filed: Sep. 9, 2002

(65) Prior Publication Data

US 2003/0063545 A1 Apr. 3, 2003

(30) Foreign Application Priority Data

Sep. 10, 2001 (JP) ............... 2001-273582
May 22, 2002 (JP) ............... 2002-148156

(51) Int. Cl.
*G11B 7/00* (2006.01)

(52) U.S. Cl. ................ 369/59.11; 369/59.24; 369/59.25

(58) Field of Classification Search ........... 369/59.11, 369/59.24, 59.25
See application file for complete search history.

(56) References Cited

U.S. PATENT DOCUMENTS

| 5,722,029 A | 2/1998 | Tomidokoro et al. |
| 5,808,992 A | 9/1998 | Kuroda |
| 6,134,204 A | 10/2000 | Taugher |
| 6,785,213 B1 * | 8/2004 | Shishido et al. ......... 369/59.25 |
| 2002/0012298 A1 | 1/2002 | Suzuki |
| 2002/0136137 A1 | 9/2002 | Shishido |
| 2003/0156511 A1 * | 8/2003 | Kuroda et al. ........... 369/47.33 |

FOREIGN PATENT DOCUMENTS

| EP | 0899735 | 3/1999 |
| EP | 1083748 | 3/2001 |
| JP | 11-134799 | 5/1999 |

OTHER PUBLICATIONS

Patent Abstracts of Japan, vol. 2000, No. 25, JP Pub. 2001/236739 (Sony Corp.) Aug. 31, 2001.

* cited by examiner

*Primary Examiner*—Wayne Young
*Assistant Examiner*—Van Pham
(74) *Attorney, Agent, or Firm*—Dickstein Shapiro LLP

(57) ABSTRACT

The present invention provides an information recording/reproducing device capable of ejecting an information recording medium during a process of formatting the medium or continuously writing data on the medium, characterized in that the device records a variable length of a lead-out in a lead-out area on the information recording medium; and the device allows the information recording medium to be ejected after the recording of the lead-out is completed.

13 Claims, 4 Drawing Sheets

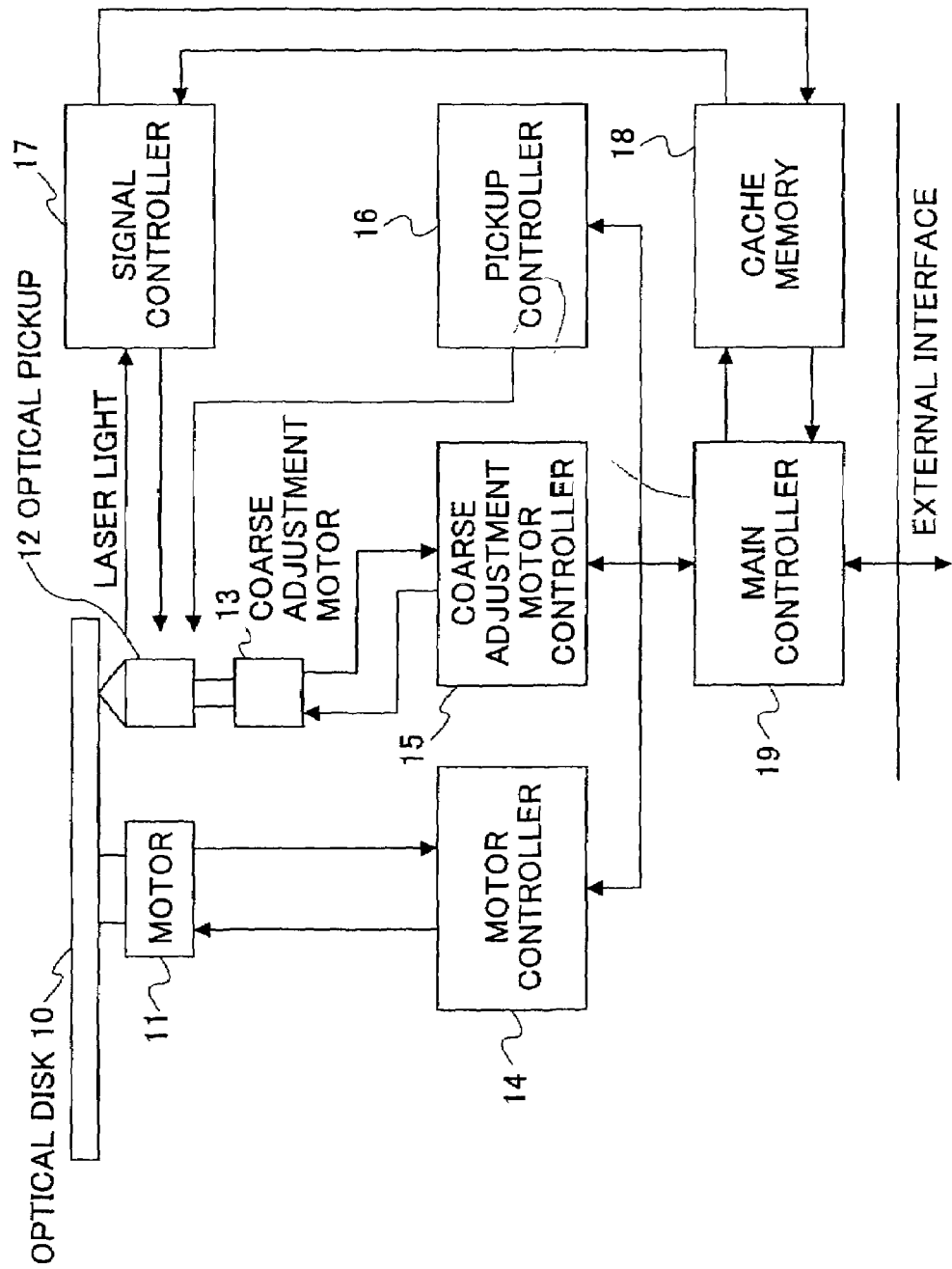

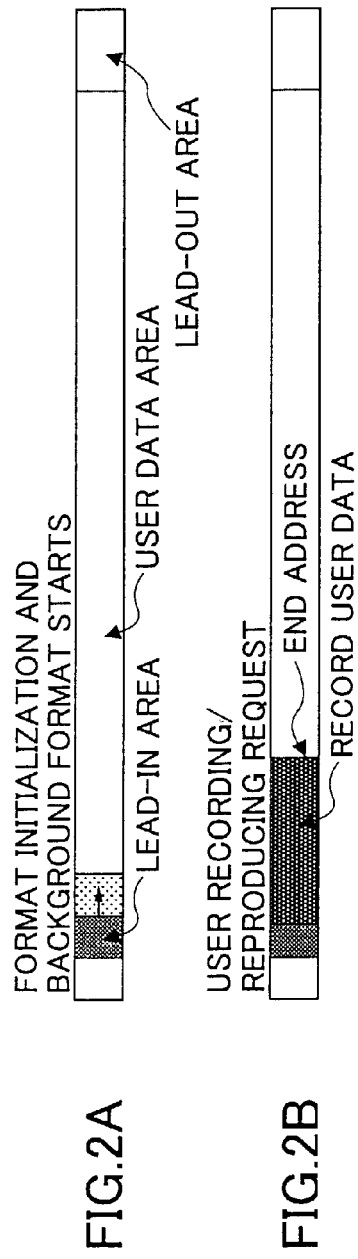
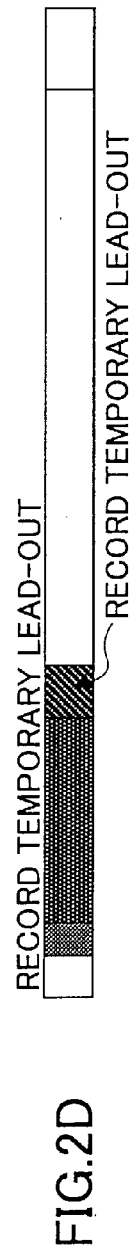
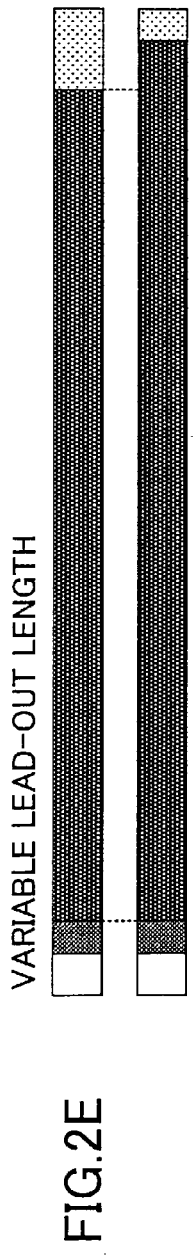
FIG.2A  FIG.2B  FIG.2C  FIG.2D  FIG.2E

INFORMATION RECORDING/REPRODUCING DEVICE AND A METHOD OF RECORDING A LEAD-OUT

BACKGROUND OF THE INVENTION

1. Field of the Invention

The present invention generally relates to an information recording/reproducing device and a method of recording a lead-out on an information recording medium. The present invention is applicable to information recording/reproducing devices for recording data on an information recording medium exchangeable in a computer system, such as optical disks like CD-R/RW, DVD-R/RW, DVD+RW/R, magneto-optical disks like MO, magnetic disks such as HD, FD, and memory cards. The present invention is applicable to information recording/reproducing devices that can eject an information recording medium during a process of background formatting. The present invention is also applicable to information recording/reproducing devices that can record a lead-out on an lead-out area on an information recording medium.

2. Description of the Related Art

There is a UDF (Universal Disc Format) system in file systems using information recording media. The UDF is employed in various devices. The recording format of the UDF can make full use of characteristics of various devices. Especially, since CD-RW or DVD+RW is capable of overwriting data, they employ the UDF that allows random recording/reproducing of data.

In the case of CD-RW, in order to record/reproduce data randomly, it is necessary to previously format the medium by recording dummy data on the whole or partial area of the medium. And also in the case of DVD+RW/-RW, it is necessary to record dummy data on the unrecorded area until some radial distance is reached, if compatibility with conventional DVD-ROM drives is required.

Further, as for CD-R/DVD-R/DVD+R as a write-once medium, although there is no formatting operation, continuous recording without an unrecorded area is needed, if compatibility with reproducing devices is to be attained. In this case, it is necessary to record something on the unrecorded area to indicate recording completion. This area is called a lead-out area.

In the above formatting process, because dummy data are recorded over the whole or designated partial area of the information recording medium, time required for formatting increases proportionally to increased capacity of the information recording medium.

In order to solve this problem, Japanese Patent Laid-open Publication No. 11-134799 "Optical disk recording/reproducing device, optical disk recording/reproducing method and computer readable recording medium" proposes an information recording/reproducing device, in which a formatting process is performed in background mode and data recording/reproducing can be carried out in a short time at user's request. Although the technology disclosed in the publication relates to background formatting for a CD-RW disk, background formatting for a DVD+RW disk is also proposed.

In the background formatting process, an unrecorded area or unformatted area is filled with dummy data during periods when no user request for data recording/reproducing is made. During the background formatting process, if a user makes a request for data recording/reproducing, then the formatting process is interrupted and data recording/reproducing begins. In this way, during the background formatting process, it is necessary to perform data recording/reproducing requested by a user and perform dummy data recording in background mode in parallel.

And during the background formatting process, it is possible for a user to remove the information recording medium from the information recording/reproducing device before completing the formatting. When removing the information recording medium, a temporary lead-out is recorded following data recording area, to allow the removed disk to be read by conventional DVD-ROM drives. The temporary lead-out indicates or marks the extent to which data have been recorded on the information recording medium. The temporary lead-out can prevent a pickup (recording/reproducing head) from unnecessarily moving to an unrecorded area and protect its optical system. The temporary lead-out needs to be of large size to some extent, because it relates to the physical operation of the device.

The temporary lead-out begins its recording at the final address in the outer radial area where the background formatting or user data recording has been completed. As for an information recording medium on which the temporary lead-out is recorded, it is possible to resume formatting from the temporary lead-out starting position at a user's request.

As mentioned above, in the conventional information recording/reproducing devices, it is possible for a user to record and reproduce data at any area during the background formatting. And it is also possible for a user to remove the disk during the background formatting. When removing the disk from the drive before completing the background formatting process, if a temporary lead-out is recorded before removing, then the disk becomes readable by conventional CD-ROM/DVD-ROM drives. The temporary lead-out is recorded following the background formatted area or data recorded area at the user's request.

However, recording such a lead-out takes a long time and consumes a large data area. And it is understood that compatibility with various CD/DVD players, recorders or other information recording/reproducing devices available in the market-place depends on the length of the lead-out. Consideration of the above situation has resulted in the present invention.

SUMMARY OF THE INVENTION

It is an object of the present invention to provide an information recording/reproducing device that is convenient to use, in which the length of the lead-out in the lead-out area is variable or adjustable. For example, in order to improve the compatibility of an information recording medium, a temporary lead-out may have a normal and standard length and position. On the other hand, in order to shorten the removing time, a minimum length lead-out can be recorded. If as large a capacity as possible of data recording area is desired, there may be provided a selection wherein a lead-out shorter than the normally required length is recorded on the disk.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by an information recording/reproducing device allowing the length of the lead-out to be variable.

According to the present invention as claimed in claim 1, there is provided an information recording/reproducing device capable of ejecting an information recording medium during a process of formatting the medium or continuously writing data on the medium, characterized in that the device records a variable length lead-out in a lead-out area on the information recording/reproducing medium; and the device allows the information recording/reproducing medium to be ejected after the process of recording a lead-out in the lead-out area is completed.

In the present invention, the length of the lead-out is variable and therefore the delay time required before removing the information recording medium (removing time) is variable and can be shortened. Accordingly, the device does not keep a user waiting so long, and becomes convenient to use. By controlling the lead-out area size, it is possible to improve the compatibility of the information recording medium with other devices. Means for allowing the information recording/reproducing medium to be ejected after the process of recording a lead-out in the lead-out area is completed corresponds to a main controller. A CPU in the main controller executes a program stored in a memory to perform the function.

According to the present invention as claimed in claim 2, there is provided an information recording/reproducing device wherein the length of the lead-out in the lead-out area on the information recording/reproducing medium is adjusted depending on the maximum radial position of the recording.

In the present invention, the length of the lead-out area is adjusted depending on the radial position of the lead-out. At whatever radial position the lead-out is recorded, the lead-out can have a certain amount of width in the radial direction. Therefore, it becomes possible to make a safe information recording medium that does not damage information recording/reproducing devices.

According to the present invention as claimed in claim 3, there is provided an information recording/reproducing device wherein the length of the lead-out in the lead-out area on the information recording/reproducing medium is previously designated by the user.

In the present invention, the length of the lead-out in the lead-out area is previously selected by the user, and therefore the removing time can be optimized in accordance with various environments.

According to the present invention as claimed in claim 4, there is provided an information recording/reproducing device wherein the length of the lead-out in the lead-out area on the information recording/reproducing medium is designated by the user when the user removes the information recording/reproducing medium from the information recording/reproducing device.

In the present invention, the length of the lead-out area is selected by the user, and therefore the optimum removal time or compatibility can be selected depending on the user's situation. For example, when the user is in a hurry, high-speed removal can be selected at the risk of low compatibility. On the other hand, when there is no hurry, a longer length lead-out can be recorded to increase compatibility.

According to the present invention as claimed in Claim 5, there is provided an information recording/reproducing system capable of ejecting an information recording medium during a process of formatting the medium or continuously writing data on the medium, comprising: an information recording/reproducing device for recording a variable length of a lead-out in the lead-out area on the information recording/reproducing medium and for allowing the information recording/reproducing medium to be ejected after the process of recording a lead-out in the lead-out area is completed; and an upper device for providing options using a GUI, the options being for designating the length of the lead-out in the lead-out area and prompting a user to make a selection.

In the present invention, options for using a GUI are provided for designating the length of the lead-out in the lead-out area and prompting the user to select an option. Therefore, the device becomes more convenient to use for a user. The information recording/reproducing system includes a combination of the information recording/reproducing device and the upper device connected to the information recording/reproducing device via an external interface, and a single information recording/reproducing system into which the function of the upper device is built.

According to the present invention as claimed in Claim 6, there is provided an information recording/reproducing system wherein the options are expressed by words.

In the present invention, the options are expressed by words instead of explaining the operation itself, and therefore the options are easy to understand and easy to select.

According to the present invention as claimed in Claim 7, there is provided a method of recording a lead-out on an information recording medium when removing the information recording/reproducing medium from an information recording/reproducing device during a process of formatting the medium or continuously writing data on the medium, characterized in that the length of the lead-out in the lead-out area on the information recording medium is variable.

In the present invention, the length of the lead-out is variable and therefore the time required for removing the information recording medium is variable and can be shortened. Accordingly, the device does not keep a user waiting so long, and becomes convenient to use.

According to the present invention as claimed in Claim 8, there is provided a method of recording a lead-out wherein the length of the lead-out in the lead-out area on the information recording medium is adjusted depending on the maximum radial position of the recording.

In the present invention, the length of the lead-out in the lead-out area is adjusted depending on the radial position of the lead-out. At whatever radial position the lead-out is recorded, the lead-out area can have a certain amount of width in the radial direction.

According to the present invention as claimed in Claim 9, there is provided a method of recording a lead-out wherein options are provided to be selected for designating the length of the lead-out in the lead-out area.

In the present invention, the options are expressed by words instead of explaining the operation itself, and therefore the options are easy to understand and easy to select.

According to the present invention as claimed in Claim 10, there is provided a method of recording a lead-out wherein the length of the lead-out in the lead-out area on the information recording medium is previously designated by the user.

In the present invention, the length of the lead-out area is previously selected by the user, and therefore the removing time can be optimized in accordance with various environments.

According to the present invention as claimed in Claim 11, there is provided a method of recording a lead-out wherein the length of the lead-out in the lead-out area on the information recording medium is designated by the user when the user removes the information recording/reproducing medium from the information recording/reproducing device.

In the present invention, the length of the lead-out in the lead-out area is selected by the user, and therefore the optimum removal time or compatibility can be selected depending on the user's situation.

According to the present invention as claimed in Claim 12, in an information recording/reproducing device capable of ejecting an information recording medium during a process of formatting the medium or continuously writing data on the medium, there is provided a program for causing a controller CPU built into the information recording/reproducing device to execute the step of allowing the information recording medium to be ejected after recording a lead-out in a lead-out area having a variable length.

In the present invention, the CPU built into the controller reads out and executes the program, and can adjust the removing time and shorten the time required for removing the medium. Therefore, the device does not keep a user waiting so long. And by controlling the size of the lead-out area, it is possible to improve the compatibility of the information recording medium.

According to the present invention as claimed in Claim 13, there is provided a memory that stores the program, the memory being readable by the CPU.

In the present invention, the CPU built into the controller reads out and executes the program, and can adjust the removing time and shorten the time required for removing the medium. Therefore, the device does not keep a user waiting so long. And by controlling the size of the lead-out area, it is possible to improve the compatibility of the information recording medium.

BRIEF DESCRIPTION OF THE DRAWINGS

FIG. 1 shows a block diagram of an information recording/reproducing device according to an embodiment of the present invention;

FIG. 2 shows data record format charts illustrating the operation according to the embodiment of the present invention;

DESCRIPTION OF THE PREFERRED EMBODIMENTS

Figure 3:
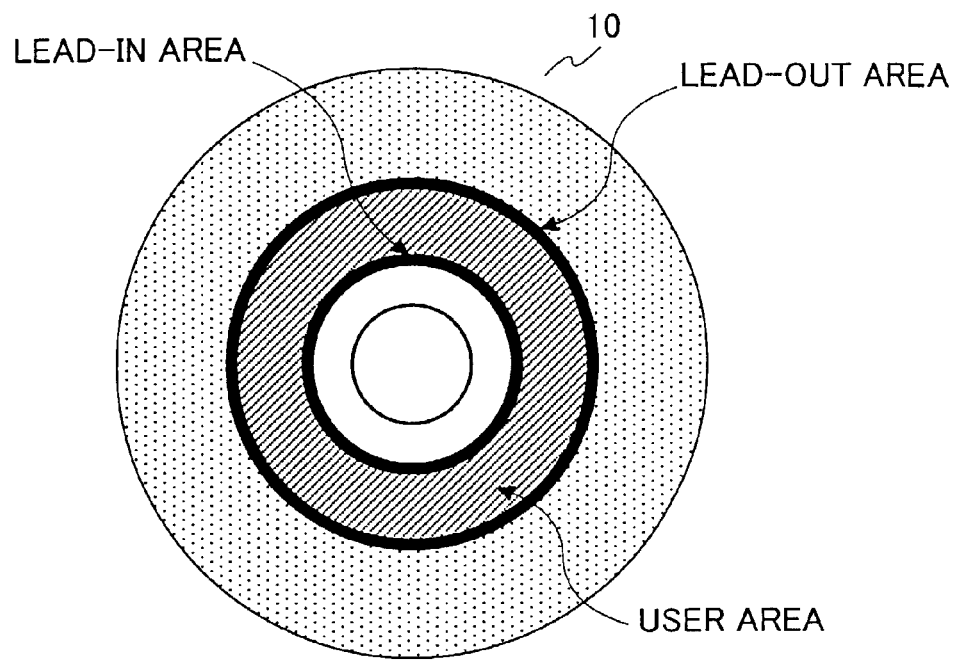
FIG. 3 shows an example of an information recording medium on which the lead-out is recorded according to the embodiment of the present invention.

In the following, embodiments of the present invention will be described with reference to the accompanying drawings.

Further, the present invention is not limited to these embodiments, but variations and modifications may be made without departing from the scope of the present invention.

FIG. 1 shows a block diagram of an information recording/reproducing device according to an embodiment of the present invention. An optical disk 10 is depicted, which is an information recording medium having a spiral track running from its inner radial portion to outer radial portion. An optical disk drive 1 is also illustrated.

As shown in FIG. 1, the optical disk drive 1 includes a motor 11 for rotating the optical disk 10, an optical pickup 12, and a coarse adjustment motor 13 for moving the optical pickup 12 in the radial directions of the optical disk 10. The optical disk drive 1 further includes a motor controller 14 for the motor 11, a coarse adjustment motor controller 15, a pickup controller 16, and a signal controller 17 coupled to the optical pickup 12.

Data read out from the optical disk 10 are stored in a cache memory 18, and transferred via a main controller 19 and an external interface to an upper or superior device (not shown). Data transmitted from the upper device are stored in the cache memory 18 and recorded on the optical disk 10.

The main controller 19 controls the interruption and resumption of background formatting and temporary lead-out recording, as explained below. The main controller 19 includes non-volatile memory to store a variety of setting data. The main controller 19 comprises a CPU and peripheral LSIs including a memory, and the CPU fetches a program from the memory and executes it to perform the above-mentioned controlling. The main controller 19 communicates with the upper device (not shown) via the external interface. The main controller 19 receives a GUI image produced by the upper device to prompt the user to make a selection, and transmits the selection result to the upper device. The communication occurs in a manner where the upper device sends a command and the optical disk drive 1 responds to the command.

FIGS. 2A–2E show area format diagrams illustrating recording operations according to embodiments of the present invention. FIGS. 2A–2E show examples of dummy data recording by background formatting, data recording/reproducing requested by a user and temporary lead-out recording in the case that a DVD+RW is used as a optical disk 10. The area formats are expressed linearly because one-dimensional addresses are assigned to recent spiraled information recording media.

When a blank disk (DVD+RW) is inserted in the optical disk drive 1 shown in FIG. 1, a format initialization process is executed to make the disk area able to be recorded on by users except for a portion of a lead-out area. Then background formatting is carried out by sequentially recording dummy data on the unrecorded area from the inner radial portion to the outer radial portion (FIG. 2A).

If a user requests to record/reproduce data, the background formatting is stopped, and the user data are recorded/reproduced (FIG. 2B). If data recording/reproducing does not reach a predetermined position when the data recording/reproducing requested by the user is completed and the disk is requested to be ejected, dummy data are written until the predetermined position or a lead-out is written at the position where the data recording/reproducing is completed (FIG. 2C).

When a user requests to interrupt the background formatting, a temporary lead-out is written at the termination address and the background formatting is stopped. In FIG. 2C, the resumption of the background formatting depends on the specific model of optical disk drive, and therefore the temporary lead-out recorded due to the request for the interruption of the formatting is not necessarily at the position where the user data recording is completed shown in FIG. 2B. When a temporary lead-out is added as shown in FIG. 2D, the position of the temporary lead-out is fixed.

As explained above, how much or how long the temporary lead-out should be recorded is important, and that is determined by the user or the optical disk drive dynamically. FIG. 2E shows a case where data can be written over the normal lead-out. The minimum length of a lead-out is determined, but lead-outs are recorded much more than the minimum amount in many cases. However, the capacity for data recording is sometimes required to be as much as possible even at the risk of lowering compatibility and reproducibility.

Figure 4:
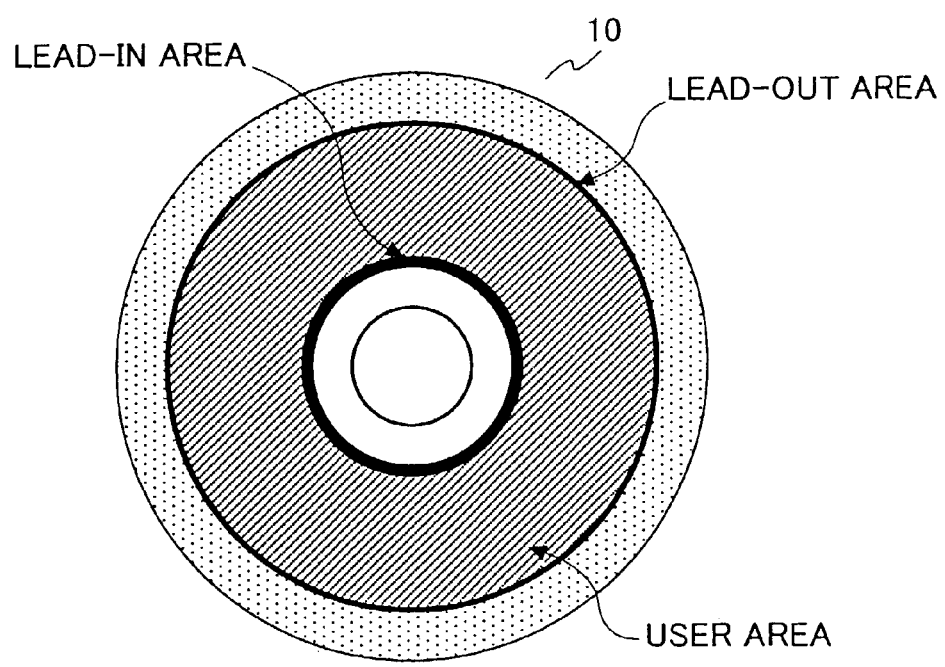
FIG. 4 shows another example of an information recording medium on which the lead-out is recorded according to the embodiment of the present invention.

FIGS. 3 and 4 show examples of an information recording medium on which information is recorded according to embodiments of the present invention. If the size of a lead-out area is fixed, the fixed lead-out area of a medium shown in FIG. 4 is narrow in the radial directions, compared with that of the medium shown in FIG. 3. The narrow lead-out area results in low reproducibility and high possibility of damaging the optical pickup 12.

Accordingly, if the size of a lead-out can be varied depending on the position of the last data recording, the necessary lead-out width can be ensured irrespective of its radial position.

As explained above, in a case where the size of the lead-out can be varied, there are some options about its size. Then a desired size can be preselected among the options, and the optical disk drive can automatically add the selected size of the lead-out.

In this case, an optical disk drive functioning with a desired specification is obtained without selecting each time. This type of optical disk drive is convenient when how to use the information recording medium and the operational environment are fixed.

There is another case where the optical disk drive indicates such options and prompts a user to select one among the indicated options when the optical disk 10 is ejected. In this case, a more flexible selection is possible, and the selection can be made in consideration of the person who will receive the optical disk 10. This case is also convenient when the selection should be made after information is recorded.

Figure 5:
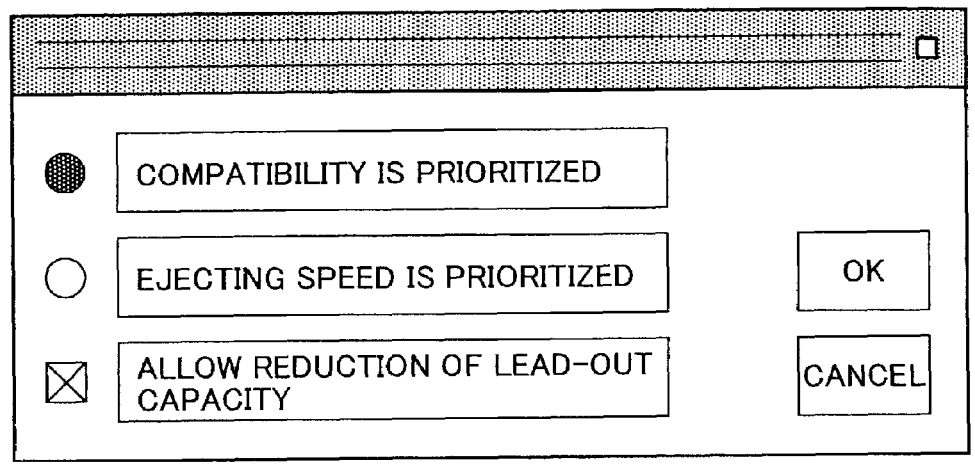
FIG. 5 shows a dialog box indicating options to be selected according to the embodiment of the present invention.

When there are some options as explained above, it is important to indicate the options and allow the user to select, from the viewpoint of user friendliness. Recently a GUI (Graphical User Interface) for using computers has been developed, and a dialog box or window can be easily indicated on a screen. Easy expressions instead of operation explanation in detail can be presented in such a dialog box (as shown in FIG. 5) to allow a user to select the desired mode. In FIG. 5, three options or modes are presented in the dialog box to allow a user select.

When "Compatibility is prioritized" is selected, a lead-out is written until a normal standard position is reached or a lead-out is written so as to have a normal standard lead-out area width. On the other hand, when "Ejecting speed is prioritized" is selected, the minimum length lead-out is written for the maximum address that is currently recorded. If maximum capacity for recording data is desired, a lead-out shorter than the normal lead-out may be utilized. In this case, "Allow the reduction of Lead-out capacity" should be selected.

The upper device (not shown) can generate the above mentioned GUI image, or present easy expressions to be selected by a user, or indicate boxes to be checked by a user to change the operation mode of the optical disk drive.

As explained above, according to the present invention, the length of a lead-out can be varied, in order to provide an information recording/reproducing device and its system that are easy to use. In order to improve compatibility, a temporary lead-out having a standard length and position is recorded. In order to get a high ejecting speed, the minimum length lead-out is recorded. Further, when maximum capacity for recording is desired, a lead-out shorter than the normal lead-out length may be utilized.

According to the present invention as claimed in Claim 1, the length of the lead-out is variable and therefore the time required for removing the information recording medium is variable and can be shortened. Accordingly, the device does not keep a user waiting so long, and becomes convenient to use. By controlling the lead-out area size, it is possible to improve the compatibility of the information recording medium.

According to the present invention as claimed in Claim 2, the length of the lead-out in the lead-out area is adjusted depending on the radial position of the lead-out. In whatever radial position the lead-out is recorded, the lead-out can have a certain amount of width in the radial direction. Therefore, it becomes possible to make a safe information recording medium that does not damage information recording/reproducing devices.

According to the present invention as claimed in Claim 3, the length of the lead-out in the lead-out area is previously selected by the user, and therefore the removing time can be optimized in accordance with various environments.

According to the present invention as claimed in Claim 4, the length of the lead-out area is selected by the user, and therefore the optimum removal time or compatibility can be selected depending on the user's situation. For example, when the user is in a hurry, high-speed removal can be selected at the risk of low compatibility. On the other hand, when there is no hurry, a longer length lead-out can be recorded to improve compatibility.

According to the present invention as claimed in Claim 5, options using a GUI are provided for designating the length of the lead-out to be recorded in the lead-out area and prompting the user to select an option. Therefore, the device becomes more convenient to use for the user. The information recording/reproducing system includes a combination of the information recording/reproducing device and the upper device connected to the information recording/reproducing device via an external interface, and a single information recording/reproducing system into which the function of the upper device is built.

According to the present invention as claimed in Claim 6, the options are expressed by words instead of explaining the operation itself, and therefore the options are easy to understand and easy to select.

According to the present invention as claimed in Claim 7, the length of the lead-out is variable and therefore the time required for removing the information recording medium is variable and can be shortened. Accordingly, the device does not keep a user waiting so long, and becomes convenient to use.

According to the present invention as claimed in Claim 8, the length of the lead-out in the lead-out area is adjusted depending on the radial position of the lead-out. In whatever radial position the lead-out is recorded, the lead-out can have a certain amount of width in the radial direction.

According to the present invention as claimed in Claim 9, the options are expressed by words instead of explaining the operation itself, and therefore the options are easy to understand and easy to select.

According to the present invention as claimed in Claim 10, the length of the lead-out to be recorded in the lead-out area is previously selected by the user, and therefore the removing time can be optimized in accordance with various environments.

According to the present invention as claimed in Claim 11, the length of the lead-out is selected by the user, and therefore the optimum removal time or compatibility can be selected depending on the user's situation.

According to the present invention as claimed in Claim 12, the CPU built into the controller reads out and executes the program, and can adjust the removing time and shorten the time required for removing the medium. Therefore, the device does not keep the user waiting so long. And by controlling the size of the lead-out area, it is possible to improve the compatibility of the information recording medium.

According to the present invention as claimed in Claim 13, the CPU built into the controller reads out and executes the program, and can adjust the removing time and shorten the time required for removing the medium. Therefore, the device does not keep the user waiting so long. And by controlling the size of the lead-out area, it is possible to improve the compatibility of the information recording medium.

What is claimed is:

1. An information recording/reproducing device capable of ejecting an information recording medium during a process of formatting the information recording medium or continuously writing data on the information recording medium, characterized in that
    recording data as requested by a user;
    if said data recording requested by said user fails to reach a predetermined position on said information recording medium, writing dummy data on said information recording medium until said predetermined position has been reached;
    said information recording/reproducing device records a variable length lead-out in a lead-out area on the information recording medium; and
    said information recording/reproducing device allows the information recording medium to be ejected after the recording of the variable length lead-out in the lead-out area is completed.

2. The information recording/reproducing device as claimed in claim 1, wherein:
    the length of the lead-out to be recorded in the lead-out area on the information recording medium is adjusted depending on a maximum radial position of the recording.

3. The information recording/reproducing device as claimed in claim 1, wherein:
    the length of the lead-out to be recorded in the lead-out area on the information recording medium is predesignated by a user.

4. The information recording/reproducing device as claimed in claim 1, wherein:
    the length of the lead-out to be recorded in the lead-out area on the information recording medium is designated by a user when the user removes the information recording medium from the information recording/reproducing device.

5. An information recording/reproducing system capable of ejecting an information recording medium during a process of formatting the information recording medium or continuously writing data on the information recording medium, comprising:
    an information recording/reproducing device for recording a variable length lead-out in a lead-out area on the information recording medium and for allowing the information recording medium to be ejected after the recording of the variable length lead-out in the lead-out area is completed; and
    an upper device for providing options for using a GUI, said options being for designating the length of the lead-out to be recorded in the lead-out area and prompting a user to select one of said options.

6. The information recording/reproducing system, as claimed in claim 5 wherein:
    the options are expressed by words.

7. A method of recording a lead-out in a lead-out area on an information recording medium when removing the information recording medium from an information recording/reproducing device during a process of formatting the information recording medium or continuously writing data on the information recording medium, characterized in that
    recording data on said information recording medium as requested by a user,
    recording dummy data on said information recording medium to a predetermined point of said information recording medium if said data recorded by said user fails to reach said predetermined point; and
    a length of the lead-out to be recorded in the lead-out area on the information recording medium is variable.

8. The method of recording the lead-out in the lead-out area as claimed in claim 7, wherein:
    the length of the lead-out to be recorded in the lead-out area on the information recording medium is adjusted depending on a maximum radial position of the recording.

9. The method of recording the lead-out in the lead-out area as claimed in claim 7, wherein:
    options are provided to be selected for designating the length of the lead-out to be recorded in the lead-out area on the information recording medium.

10. The method of recording the lead-out in the lead-out area as claimed in claim 7 or 9, wherein:
    the length of the lead-out to be recorded in the lead-out area on the information recording medium is predesignated by a user.

11. The method of recording the lead-out in the lead-out area as claimed in claim 7 or 9, wherein:
    the length of the lead-out to be recorded in the lead-out area on the information recording medium is designated by a user when the user removes the information recording medium from the information recording/reproducing device.

12. In an information recording/reproducing device capable of ejecting an information recording medium during a process of formatting the information recording medium or continuously writing data on the information recording medium, comprising
    a program for causing a controller CPU built into the information recording/reproducing device to execute the steps of:
    recording data as requested by a user;
    determining if said recorded data reached a predetermined point on said information recording medium;
    in the event that said recorded data has not reached said predetermined point, writing dummy data on said information recording medium until said predetermined point has been reached;
    allowing the information recording medium to be ejected after recording a variable length lead-out in a lead-out area on the information recording medium.

13. The information recording/reproducing device as claimed in claim 12, further comprising
    a memory that stores the program, said memory being readable by the controller CPU.

* * * * *